United States Patent Office 2,979,414
Patented Apr. 11, 1961

2,979,414
CERAMIC TOOL MATERIAL

Eugene I. Ryshkewitch, Ridgewood, N.J., and Hiram Taylor, Shreve, Ohio, assignors to United States Ceramic Tile Company, Canton, Ohio, a corporation of Delaware No Drawing. Filed Nov. 15, 1957, Ser. No. 696,600

12 Claims. (Cl. 106—44)

The present invention relates to ceramic materials and similar articles, and especially to ceramic materials of high strength and hardness suitable for cutting tools and the like.

In recent years industry has developed harder and tougher materials and projects such as the atomic energy, guided missile and jet programs which have produced so-called "unmachinable" materials. Metals, such as titanium, have become available in quantity in recent years and have introduced problems other and different from mere hardness and toughness, such as, for example, titanium's tendency to combine chemically with cutting tools and uranium's pyrophoric properties.

These new materials and the increasing need for higher cutting speeds, closer tolerances and better finishes have imposed new and excessive demands on tools and tool materials, so that the tool steels and alloys of a few years ago are wholly inadequate for these new tasks. Even the cemented carbides, such as tungsten carbide, are not wholly adequate for the extreme demands imposed upon cutting tools at the present day and it has been necessary to form cutting tools, dies and the like from even harder materials such as ceramics. A description of the demand for ceramic tools and the early development of ceramic tools and ceramic tool material appears in American Machinist for March 12, 1956. Other articles on ceramic tooling appear in Carbide Engineering in the October and December 1956 issues.

One of the most desirable ceramic materials for the formation of machining tools is alumina ($Al_2O_3$) which has high inherent hardness and high mechanical strength. This inherent hardness cannot be varied to any appreciable extent but the mechanical strength properties of the final alumina containing tool materials can be varied to a considerable degree depending upon the manner in which the alumina ceramic body is produced.

Alumina tools are produced by pressing alumina particles at relatively high temperatures and pressures in a manner somewhat similar to the techniques used in the formation of cemented carbide tools. It has been found that the alumina body attains its maximum strength when the alumina crystals are extremely small and the body has been compressed to maximum density. When the temperature at which the alumina body is fired is too high or when the alumina body is maintained too long at the firing temperature, the individual alumina crystals tend to grow and when the crystal growth becomes appreciable, the resulting body is less strong. It has been found that the best way to obtain a well-fired but dense alumina body with a fine crystalline structure is to apply as low a temperature for as short a period of time as possible and at the same time employing high pressure. Apparently, at sufficiently high temperatures but which are still well below the melting point, normally rigid and brittle refractory materials such as alumina have a certain ability to flow or deform under the influence of pressure and with alumina it has been found that some plastic deformation can be obtained at temperatures above about 1650° C. under pressures of 1500 p.s.i. and above.

In order to permit the formation of alumina tools at lower temperatures and pressures, other substances such as metal powder have been added to the alumina and the tool is formed in a manner similar to the cemented carbides. However, the metal is neither so hard nor so strong as alumina, particularly at elevated temperatures, so that these cemented alumina tools known as cermets are less hard and strong than hot-pressed pure alumina.

Tools hot-pressed from substantially pure alumina have many great advantages over other types of available tool materials in hardness, strength and resistance to corrosion, especially at high temperatures. However, hot-pressed alumina tools exhibit flank-wear and efforts have been made to increase the hardness of the alumina to overcome this flank-wear. Heretofore, these efforts have involved mixing harder and stronger materials with the alumina and hot-pressing the resulting mixture, but most of these efforts have been unsuccessful because of the chemical reactions which take place at the highly elevated temperatures. For example, boron carbide is chemically unstable in contact with alumina at high temperatures and at the temperatures involved, diamond is converted to graphite.

It has been found, however, that in a neutral or reducing atmosphere, silicon carbide is chemically inert and stable in contact with alumina practically to the melting temperature. When intimate mixtures of fine grained silicon carbide and fine alumina powder are hot-pressed in graphite molds, the resulting product is harder and stronger than hot-pressed pure alumina and the flank wear of a tool is substantially decreased.

It is accordingly a primary object of the invention to provide a hard wear-resistant ceramic material including a mixture of fine-grained silicon carbide particles and fine alumina crystallites suitable for use in tools for machining of various materials.

It is a further object of the invention to provide a hard, wear-resistant ceramic material comprising a mixture of silicon carbide particles and fine alumina particles hot-pressed into a dense mass wherein there are no gaps between the particles.

It is a further object of the invention to provide a method for mixing and hot-pressing a mixture of fine-grained silicon carbide particles and fine alumina particles to yield a hard, wear-resistant product suitable for use as a machine tool or as a fixture which is subject to heavy abrasion.

These and other objects and advantages reside in novel features and steps as will hereinafter be pointed out in the following specification and claims.

In forming articles according to the present invention, the particle size of the alumina should be as small as practicable and a maximum particle size of about five microns is preferred. The silicon carbide particles should be approximately the same size as the alumina particles. When substantially all of the particles are about five microns or less, a strong, hard, durable material results.

Satisfactory tools can be formed of pure hot-pressed alumina but the hardness and strength of the material is increased when silicon carbide is added. Above about 50% silicon carbide by volume (about 45% by weight), the strength of the material diminishes because silicon carbide alone will not sinter as does alumina. Higher mechanical strength and wear resistance is obtained without appreciable sacrifice of hardness when the silicon carbide does not exceed 30% by volume (approximately 25% by weight) and at that ratio, the flank wear of a cutting tool is substantially less than that of a pure hot-pressed alumina tool. When the silicon carbide is as high as 30%, however, there is some cratering of the tool adjacent the cutting edge and this may be undesirable. We have found that when a still lower percentage of silicon carbide is used, preferably about 8–15% by volume, there is a minimum of cratering and the flank wear is also substantially less than that of a pure alumina tool.

When a tool is formed of hot-pressed material containing about 8–15% by volume (approximately 6 to 12.5% by weight) of silicon carbide and the remainder alumina, the tool is characterized by increased side flank stability, excellent cutting edge stability and absence of cratering. The tool performance and life surpass anything known from published data and is vastly superior to the cemented carbides such as tungsten and titanium carbide and also to the best ceramic alumina tools containing no silicon carbide.

In producing the tool material of the present invention, the particles of silicon carbide and alumina are mixed in the proper ratio and are preferably wet ball milled into slurry. Commercial alumina can be used and preferably should have a maximum grain size of 2–5 microns, an alkali content of less than 0.05%, and a low silica and iron content. "Alcoa A–14" alumina is a commercial product which meets these specifications. The alkali content may be reduced by a leaching in water and the iron content by a leaching with acid. The wet material may then be briquetted and filter pressed to remove the water and water solubles. In order to avoid the admixture of impurities the grinding balls are preferably formed of the same material. The pressed mixture is then placed in a graphite mold, pressure is applied by graphite pistons, and the mass heated by any suitable means such as by induction heating. At the temperatures involved, there is some tendency for the material to pick up carbon from the graphite molds and plungers and this can be avoided by lining the mold and facing the plunger with molybdenum metal foil. The duration of the hot-pressing should be the minimum time required to achieve maximum density of the material because excess heating time promotes excessive crystal growth of the alumina and causes weakening of the final product. Crystal growth may also be inhibited by the addition of small amounts (0.5%) of magnesium fluoride.

The minimum temperature at which the silicon carbide-alumina composite product can be sintered is about 1650° C. and the minimum pressure for this operation is about 1500 p.s.i. Normally, however, the sintering operation takes place somewhat above these temperatures and pressures, care being exercised to avoid excessive heating. During sintering, the material is maintained in a non-oxidizing atmosphere such as nitrogen. Utilizing a pressure of approximately 3,000 p.s.i., and a maximum temperature of about 1800° C. small pieces can be hot-pressed in less than five minutes and even large pieces four or five inches in diameter can be hot-pressed in thirty minutes or less. The final product has a vitreous appearance with good resistance to abrasion at high temperatures and thermal shock resistance superior to that of pure alumina.

The resulting molded shape is substantially at theoretical density and no gaps appear between the silicon carbide grains and alumina crystallite even under very high magnification. The bond between the alumina crystallites and the silicon carbide grains is apparently as strong as the crystallites and grains themselves because when the hot-pressed composite material is subjected to impact by a hardness test-tool, cracks propagate not only along the boundaries between the crystallite and silicon carbide grains but directly across the crystallites and grains themselves. The material can be used for wear-resistant parts requiring high compression strength, hardness and stability and the material is highly resistant to corrosion when used as a die material. The material has no tendency to seize metal under high pressures at elevated temperatures, since it does not contain any metal alloying constituent and its coefficient of friction with metal is relatively low. While this improved material will have its major application in the formation of tools and dies, it is also useful in other applications where resistance to abrasion is important, such as in the formation of blast nozzles.

When used as a cutting tool, the material is normally formed as an insert and may be made in various standard forms such as those presently used for sintered pure alumina tools and various standard shapes are shown, for example, in catalogue No. 2 of the Diamonite Products Division of United States Ceramic Tile Company.

The same type of tool may be used for holding the inserts as are presently used with inserts of hot-pressed alumina and various satisfactory tools are known. For example, the Diamonite "Super-Rigid" tool holder may be successfully used with inserts of this material and other satisfactory tool holders are shown in the March 12, 1956 issue of American Machinist.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A wear-resistant, dense, non-porous material consisting essentially of an intimate mixture of fine-grained silicon carbide particles and fine alumina particles, the silicon carbide particles constituting from about 8 to about 50% by volume of the mixture, wherein the particles are in intimate contact without gaps therebetween.

2. A wear-resistant, dense, non-porous material consisting essentially of an intimate mixture of fine-grained silicon carbide particles and fine alumina particles, the silicon carbide particles constituting from about 6 to about 45% by weight of the mixture, wherein the particles are in intimate contact without gaps therebetween.

3. A wear-resistant, dense, non-porous material consisting essentially of an intimate mixture of fine-grained silicon carbide particles and fine alumina particles, the silicon carbide particles constituting from about 8 to about 30% by volume of the mixture, wherein the particles are in intimate contact without gaps therebetween.

4. A wear-resistant, dense, non-porous material consisting essentially of an intimate sintered mixture of from about 8 to about 15 volume percent of fine-grained silicon carbide particles and from about 92 to about 85 volume percent of alumina particles, wherein the particles are in intimate contact without gaps therebetween.

5. A water-resistant, dense, non-porous material consisting essentially of an intimate sintered mixture of from about 6 to about 12.5 weight percent of fine-grained silicon carbide particles and from about 94 to about 87.5 weight percent of fine alumina particles, wherein the particles are in intimate contact without gaps therebetween.

6. A wear-resistant, dense, non-porous material consisting essentially of an intimate sintered mixture of fine-grained silicon carbide particles having a maximum diameter no greater than 5 microns and fine alumina particles having a maximum diameter no greater than 5 microns, the silicon carbide particles constituting not more than 50 volume percent of the mixture, wherein the particles are in intimate contact without gaps therebetween.

7. A wear-resistant, dense, non-porous material consisting essentially of an intimate pressed and sintered mixture of fine-grained silicon carbide particles having a maximum diameter of no greater than 5 microns and fine alumina particles having a maximum diameter of no greater than 5 microns, the silicon carbide particles constituting from about 8 to about 30 volume percent of the mixture, wherein the particles are in intimate contact without gaps therebetween.

8. A wear-resistant, dense, non-porous material consisting essentially of an intimate pressed and sintered mixture of from about 8 to about 15 volume percent of fine-grained silicon carbide particles having a maximum diameter of no greater than 5 microns and from about 92 to about 85 volume percent of alumina particles having a maximum diameter of no greater than 5 microns, wherein the particles are in intimate contact without gaps therebetween.

9. A ceramic machine tool consisting essentially of a pressed and sintered mixture of from about 8 to about 15 volume percent of fine-grained silicon carbide particles and from about 92 to 85 volume percent of alumina particles, wherein the particles are in intimate contact without gaps therebetween.

10. A method of producing a wear-resistant ceramic material comprising forming a mixture consisting essentially of fine-grained silicon carbide particles and fine alumina particles, the silicon carbide particles constituting from about 8 to about 50 percent by volume of the mixture, and hot-pressing said mixture in a mold at a temperature between 1650° C. and 1800° C. and a pressure between 1500 p.s.i. and 3000 p.s.i. to obtain a material wherein the particles are in intimate contact without gaps therebetween.

11. A wear-resistant, dense, non-porous material consisting essentially of a pressed and sintered intimate mixture of fine-grained silicon carbide particles and fine alumina particles wherein the particles of the mixture are at all points in intimate contact without gaps therebetween, said silicon carbide particles constituting from about 6 to about 45 percent by weight of the mixture, said mixture containing about 0.5 weight percent of magnesium fluoride.

12. A wear-resistant, dense, non-porous material consisting essentially of a pressed and sintered intimate mixture of fine-grained silicon carbide particles and fine alumina particles wherein the particles of the mixture are at all points in intimate contact without gaps therebetween, said mixture comprising 5.75 to about 12.25 weight percent of silicon carbide, about 93.75 to 87.25 weight percent alumina, and about 0.5 weight percent of magnesium fluoride.

References Cited in the file of this patent

UNITED STATES PATENTS

| | | |
|---|---|---|
| 2,314,758 | Berns | May 23, 1943 |
| 2,388,080 | Riddle | Oct. 20, 1945 |
| 2,531,397 | Caton | Nov. 28, 1950 |
| 2,618,567 | Comstock | Nov. 18, 1952 |
| 2,751,188 | Rath | June 19, 1956 |

UNITED STATES PATENT OFFICE
CERTIFICATE OF CORRECTION

Patent No. 2,979,414                                    April 11, 1961

Eugene I. Ryshkewitch et al.

It is hereby certified that error appears in the above numbered patent requiring correction and that the said Letters Patent should read as corrected below.

Column 4, line 57, for "water-resistant" read -- wear-resistant --.

Signed and sealed this 26th day of September 1961.

(SEAL)
Attest:

ERNEST W. SWIDER                               DAVID L. LADD
Attesting Officer                                   Commissioner of Patents

USCOMM-DC